(12) United States Patent
Kumarjiguda et al.

(10) Patent No.: US 9,098,565 B1
(45) Date of Patent: Aug. 4, 2015

(54) IN-HOUSE ELEGANT JDBC CONNECTION POOLING SOLUTION FOR MESSAGE BROKER

(75) Inventors: Meera Deshpande Kumarjiguda, Edison, NJ (US); Vanasri Gururaj Upadhye, Old Bridge, NJ (US); Ryan Stewart-Gardiner, Budd Lake, NJ (US); Shankar Kulkarni, Bridgewater, NJ (US); Venkat Gaddam, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 958 days.

(21) Appl. No.: 12/575,988

(22) Filed: Oct. 8, 2009

(51) Int. Cl.
*G06F 7/00* (2006.01)
*G06F 17/30* (2006.01)

(52) U.S. Cl.
CPC ................................ *G06F 17/30604* (2013.01)

(58) Field of Classification Search
USPC .................... 707/999.104, 999.102, 705, 609
See application file for complete search history.

(56) References Cited

U.S. PATENT DOCUMENTS

| | | | |
|---|---|---|---|
| 6,338,089 B1* | 1/2002 | Quinlan | 709/227 |
| 6,850,941 B1* | 2/2005 | White et al. | 1/1 |
| 7,269,692 B2* | 9/2007 | Irudayaraj | 711/118 |
| 8,239,535 B2* | 8/2012 | Error et al. | 709/226 |
| 2004/0255307 A1* | 12/2004 | Irudayaraj | 719/328 |
| 2005/0015356 A1* | 1/2005 | Ireland et al. | 707/1 |
| 2005/0038801 A1* | 2/2005 | Colrain et al. | 707/100 |
| 2006/0200503 A1* | 9/2006 | Dosa et al. | 707/203 |
| 2007/0136311 A1* | 6/2007 | Kasten et al. | 707/10 |
| 2008/0294575 A1* | 11/2008 | Jung | 705/400 |

OTHER PUBLICATIONS

Websphere Message Broker, IBM, Jul. 8, 2009 <http://www-01.ibm.com/software/integration/wbimessagebroker/>.

* cited by examiner

*Primary Examiner* — Hosain Alam
*Assistant Examiner* — Eliyah S Harper

(57) ABSTRACT

Connection pooling is proved in the context of middleware. A request is first received from an application. The received request is forwarded to a back end mechanism. When a response is received from the back end mechanism, as a response to the request, information is obtained from the response. A pool of database connections is maintained with at least a minimum number of connections open, where the minimum number of connections is determined independent of one or more application threads. To store the information in a database, a database connection is allocated from a pool of open database connections created to facilitate access to the database. After the information is stored in the database using the database connection, the database connection is returned to the pool of database connections.

32 Claims, 9 Drawing Sheets

IN-HOUSE ELEGANT JDBC CONNECTION POOLING SOLUTION FOR MESSAGE BROKER

BACKGROUND

1. Technical Field

The present teaching relates to method and system for data connections. More specifically, the present teaching relates to method and system for connection pooling mechanism.

2. Discussion of Technical Background

Computer applications have evolved over several decades. Modern computer applications often manifest themselves in an infrastructure that involves layers of support. In addition, due to diversity of platforms on which a computer application user can operate, more and more computer applications are designed to support interfaces to facilitate the applications to interact with users of different platforms. For example, some users may interface with a computer application via an application designated window displayed on a desktop computer (e.g., PowerPoint) but other users may interact with the same underlying computer application via an Internet interface which allows multiple users across the Internet to share the same PowerPoint application. As another example, an account management system may allow an end user (customer) to interact with an Internet interface to change account information or check account balance information. The same account management system, however, may also allow a billing specialist from the service provider to conduct monthly billing activities. In this case, the billing specialist may interface with the account management system differently. In addition, when different users interface with an application differently, the underlying communication protocols used may also differ. In an account management system example, some may use XML and some may use FTP.

To make a computer application, especially a network based application, perform its core functionalities, an application is often divided into a front end and a back end. Front end applications are those used to interface with different users. Back end applications are those used to perform certain core functionalities of the application. For instance, a front end application of an account management system may be devoted to interfacing with customers to allow a customer to change the account information, to change subscription, etc. However, a different front end application may provide the interface for billing specialists.

The interaction data from the front end application may need to be sent to the corresponding back end of the application where all the core functions are performed and data are stored in databases. For instance, a customer may request, via a front end interface of an account management system to change the cellular phone service subscription from a 200 free minute plan to a 400 free minute plan. Upon receiving the information regarding the change, the front end has to communicate with the back end to effectuate the change. To achieve that, the information received from the Internet from the customer needs to be delivered to the back end in a form that is recognizable by the back end. This is often achieved via so called middleware.

FIG. 1(a) (Prior Art) shows a conventional system configuration 100 between front end applications 110-1, 110-2, ..., 110-K and a back end system 150 via a middleware called enterprise service bus (ESB) provider 130. As shown, the front end applications communicate with the ESB Provider 130 via a network connection 120. Upon receiving the information from a front end application, the ESB Provider 130 forwards the information to the back end system 150. In some situations, when the front end and back end system support different communication protocols, the ESB Provider 130 may also translate information from either side by transforming from the source format to a destination format to facilitate communication. In some systems, specific buffers may be deployed to store messages from either side. For example, as shown in FIG. 1(a), message queues 140 may be used to buffer messages from front end applications and back end systems. A request made by a front end application may be converted into a message of an appropriate format and stored in the message queues 140. Such queued messages may then be retrieved by the back end system 150 and processed accordingly. When the processing is completed, the back end system 150 may also send a response to the message queues 140. Such buffered responses may then be retrieved by the ESB Provider 130. Such retrieved responses may then be transformed into a format appropriate to the front end application and transmitted to the front end application.

There are other functionalities performed by the middleware ESB Provider 130. For instance, for each transaction that a front end application requests the back end system 150 to perform, certain transaction information (e.g., account identification, nature of the transaction, status of the transaction, date and time of the transaction, etc.) may be recorded in some database(s) within the ESB Provider 130 to facilitate future needs. For instance, a bank account management system may allow a customer to deposit or transfer money around. Information related to all such transactions may be stored in the ESB Provider 130. Another application may be designed to generate monthly statements. To do so, the monthly statement application may retrieve all the information stored in the ESB Provider 130 related to all the deposits and money transfers made by each customer. In this case, the monthly statement application may retrieve transactional information from the ESB Provider.

To access information stored in a database, a database connection is usually made to the database driver. To open such a connection is usually time consuming. In addition, when a data access operation is completed, the database connection is usually closed, which also takes time. When such access is frequent, the time required to open and close database connections negatively affects the bandwidth needed to access the databases. To solve this problem, connection pooling has been used. Under connection pooling, a pool of database connections is created in which a set of database connections are open and can be provided upon request. Once a connection is used, it can be returned to the pool so that it can be used for the next request. That is, the database connections in the pool are open all the time so that the time required to open and close database connections is saved.

FIG. 1(b) (Prior Art) shows a conventional connection pooling scheme under which the number of connections opened in the connection pool is determined by each thread group during execution. As shown, at the front end application layer 160, there are, e.g., three thread groups, 170-1, 170-2, and 170-3, and each thread group includes a number of application threads (3, 5, and 4, respectively). In this conventional solution, each thread group determines its own number of connections pooled. For instance, the first thread group 170-1 opens 3 connections for pooling purposes. The second thread group 170-2 opens 5 connections for pooling purposes. The third thread group 170-03 opens 4 connections for pooling. Overall, there are a total of 12 connections open and connected to the database driver 180 and the database 190.

With this conventional solution, the total number of connections opened for pooling equals the number of application threads and, hence, there is no actual pooling. Because the number of connections opened is large, it is therefore still costly. This connection pooling solution does not provide much advantage. A more cost effective connection pooling scheme, for example, in the context of ESB Provider, is therefore needed.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching relates to apparatus and method for middleware, such as an ESB provider, with a global connection pooling mechanism to facilitate access to databases. The connection pooling mechanism disclosed herein is global in the sense that the number of connections that are open is not determined by each thread group, as is conventionally the case in the context of an ESB provider. In addition, a minimum number of idle connections are kept open without being closed so that database accesses can be made much faster and efficient. Details of the present teaching are discussed below with respect to FIGS. 2-10.

Figure 2:
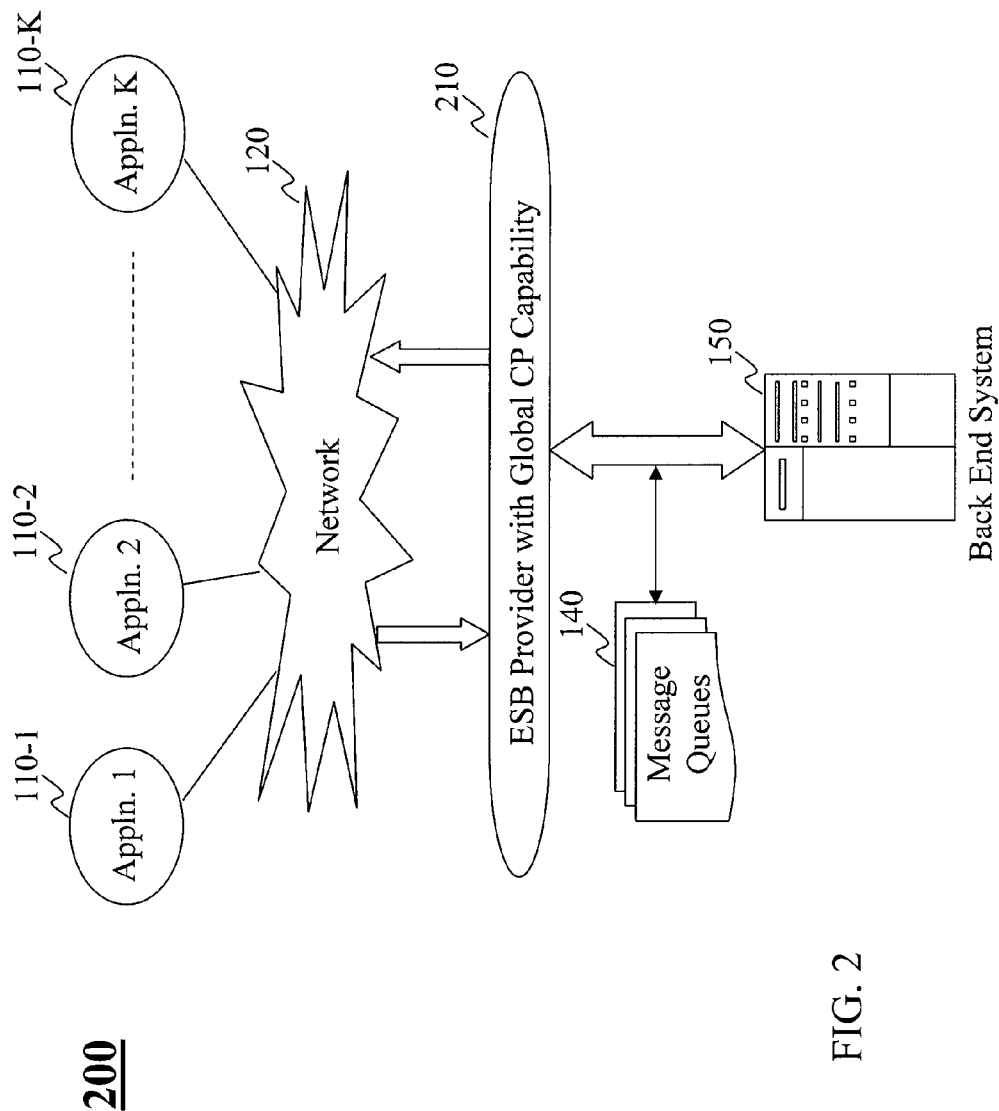
FIG. 2 depicts a system configuration between front end applications and a back end system via an ESB provider with global connection pooling capability, according to an embodiment of the present teaching.

FIG. 2 depicts an exemplary system configuration 200 between one or more middleware front end applications 110 and a back end system 150 via an ESB provider 210 that has global connection pooling (CP) capability, according to an embodiment of the present teaching. The exemplary system 200 comprises one or more front end applications 110-1, 110-2, ..., 110-K, an ESB provider 210, and a back end system 150. A front end application (e.g., 110-1) communicates with the back end system 150 via the ESB provider 210 through a network connection 120. Optionally, the ESB provider 210 may facilitate such communication via message queues 140 by posting messages from a front end application in the message queues 140 and receiving responses posted by the back end system 150 from the message queues 140.

The network 120 connects the front end applications to the ESB provider 210. The network 120 can be any form of network connections such as a local area network (LAN), wide area network (WAN), the Internet, a virtual network, a wired network, a wireless network, a public switched telephone network (PSTN), a proprietary network, a public network, or any combination thereof. The communication between a front end application and the ESB provider 210 can be conducted via any communication protocol appropriate for the application and supported by the ESB provider 210.

A front end application can be any application that supports interactions between an end user and a particular online function. For example, a front end application can be an automated customer support system (ACSS), an interactive voice retrieval (IVR) system, an online platform for customer management, a business to business online account management system, or a billing system. For example, an end user may interface with an IVR system (a front end application) to retrieve voice data recorded at a network node. In addition, a billing system (another front end application) may be activated to do a monthly billing of the end user so that all transactions requested within a month period will be used to calculate the monthly payment under the subscribed plan of the end user.

When an end user interacts with a front end application, data provided by the end user, either a request or information related to the user or an underlying transaction, needs to be delivered to the back end system 150 in order for a back end system (not shown) to process the information or carry out a transaction requested. For example, the type of request (e.g., retrieve voice message), the user login information, etc. When the requested transaction is completed, the back end system may produce some response, including the status of the transaction (e.g., successful in retrieving 3 messages) or the confirmed information used in the transaction (e.g., end user's identification information), and return such a response to the end user through the ESB provider 210 and the front end application interfaces.

Some of the transactional information returned to the end user may be recorded in a database located within the ESB provider 210 as, e.g., transaction log data. Such recorded log data may later be retrieved by a different front end application, e.g., a billing system, for the purposes of generating a monthly bill to users. In recording such information associated with each transaction under any front end application, the ESB provider 210 utilizes the global connection pooling capability disclosed herein to facilitate faster and efficient database operations. With respect to connection pooling, the database connections that are opened for accessing databases are pooled together and shared among different applications that are in need of database accesses. Details related to how the connection pooling is achieved in a global manner is discussed with reference to FIGS. 6-8.

Figure 3:
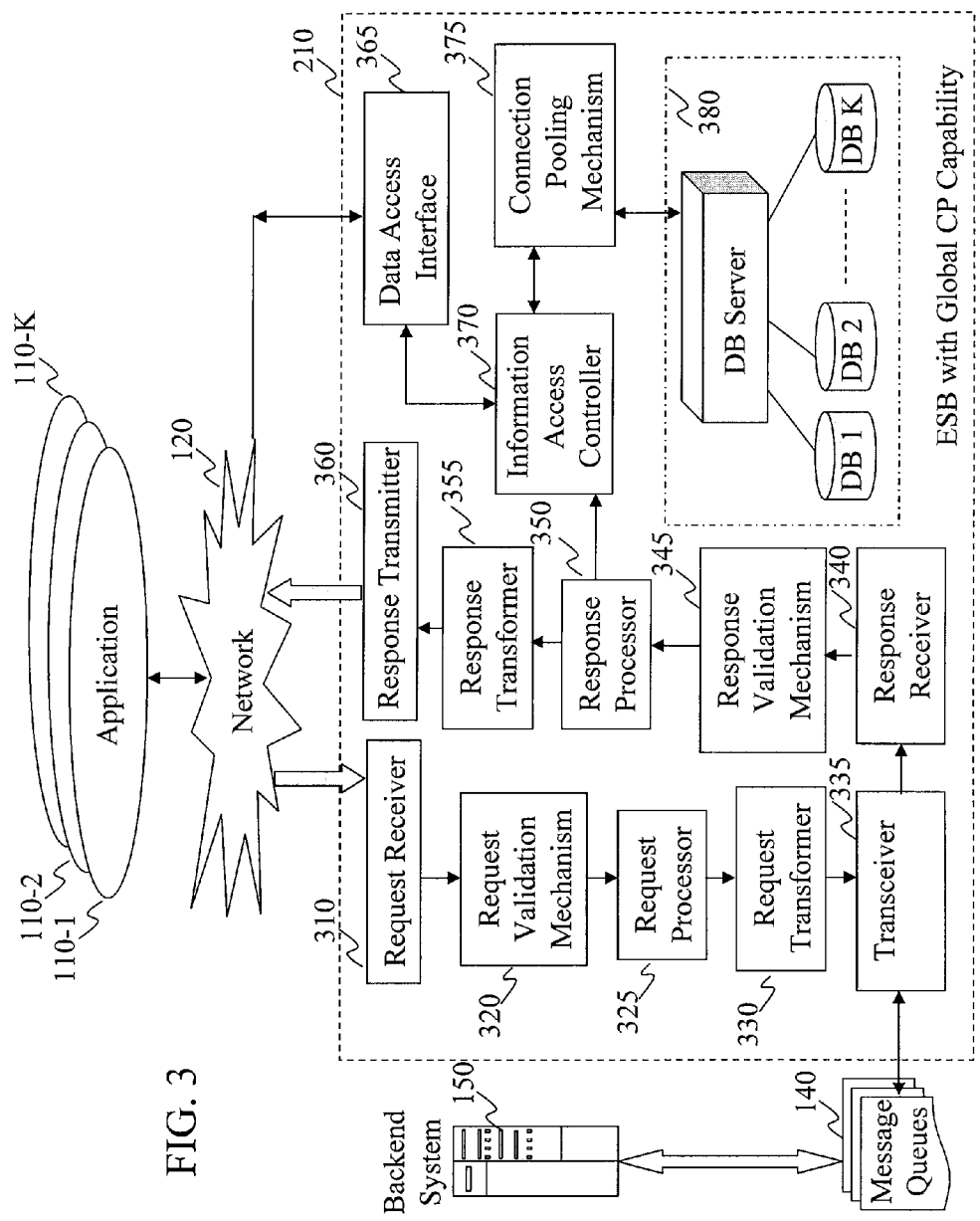
FIG. 3 depicts a system diagram of an exemplary ESB provider with global connection pooling capability, according to an embodiment of the present teaching.

FIG. 3 depicts an exemplary system diagram of the ESB provider 210 having global connection pooling capability, according to an embodiment of the present teaching. In the illustrated embodiment, the ESB provider 210 comprises an incoming request process flow (including a request receiver 310, a request validation mechanism 320, a request processor 325, and a request transformer 330), a transceiver 335, and an outgoing response process flow (including a response receiver 340, a response validation mechanism 345, a response processor 350, a response transformer 355, and a response transmitter 360), a data access interface 365, an information access controller 370, a connection pooling mechanism 375, and a database system 380 (a database server and a plurality of database storages). Any of the components in the ESB Provider 210 may be implemented as a hardware component, a software component, a middleware component, or a combination thereof.

Figure 5:
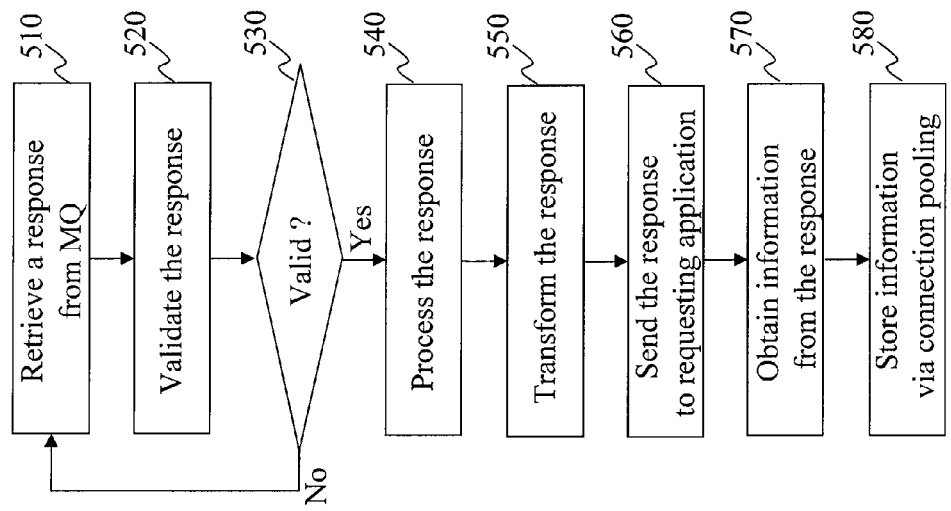
FIGS. 4-5 are flowcharts of an exemplary process in which an ESB provider with connection pooling capability provides an interface between a front end application and back end system, according to an embodiment of the present teaching.
Figure 4:
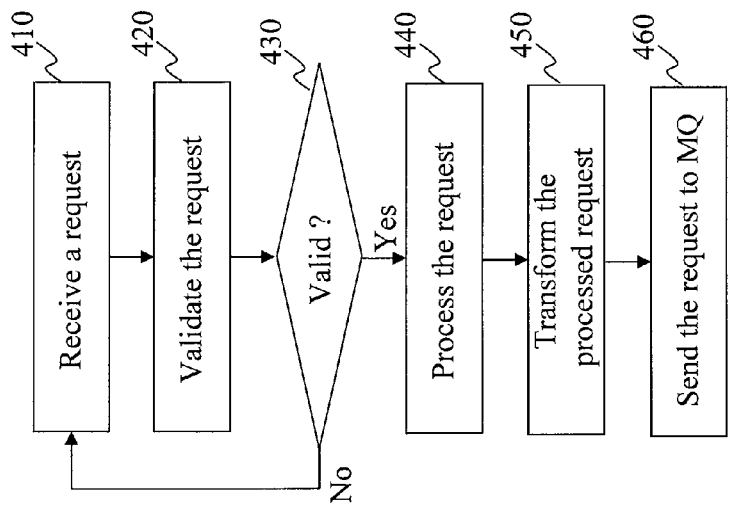

The processing steps of the incoming request process flow and the outgoing response flow are discussed in FIGS. 4-5, according to an embodiment of the present teaching. The request receiver 310 first receives, at 410, a request from a front end application (e.g., 110-1) via the network 120. The received request is forwarded to the request validation mechanism 320 to validate, at 420, the request. For example, a request may not be valid if it is not coded correctly. In addition, if a request is not supported, the request may also be considered as invalid. If the request is not valid, determined at 430, the incoming request process flow returns to 410 to receive the next request.

If the request is valid, the request processor 325 processes, at 440, the request. The processing performed on the request may be based on different considerations. For example, syntactic analysis may be performed on the request so that semantically meaningful words or information may be extracted from the request. The processed request is then transformed, at 450, to generate a formatted request, which is then sent to the message queues 140 at 460. The re-formatting of the request may be performed so that the request is to be sent to the back end system 150 in a format that is supported and recognizable. For instance, information extracted from a request received may be re-formatted in, e.g., XML, before it is sent, by the transceiver 335, to a message queue 140. The request queued in the message queues 140 is then taken by the back end system 150.

Upon receiving a request from the message queues 140, the back end system 150 provisions the request and executes the request. When the execution is completed, the back end system generates a response to the request and places the response in the message queues 140.

FIG. 5 is an exemplary flowchart of the outgoing response process flow, according to an embodiment of the present teaching. After the response from the back end system is queued, the transceiver 335, receives the response at 510. The response validation mechanism 345 then validates, at 520, the received response. If the response is not valid, determined at 530, the flow returns to 510 to receive next response. If the response is valid, the response processor 350 processes, at 540, the response. Similar to the processing of a request, a response is processed so that useful information may be individually identified and extracted from the response, e.g., formatted in an XML format.

To send the response to a front end application, the response may need to be re-formatted in a style that is supported by the front end application. Therefore, the processed response is transformed, at 550, before it is sent, at 560, to the front end application that made a corresponding request for which the response is generated. When various useful information is extracted from the response, some of the information may also be stored in a database for future purposes (e.g., billing). To do so, some of the information contained in the response is obtained, at 570, by the information access controller 370 that is responsible for read, write, and update information stored in the database system 380.

To store information from a response in the database system 380, the information access controller 370 establishes a connection to the database system 380 via the connection pooling mechanism 375. Through such a connection, information is stored, at 580, in the database system 380. Such stored information may be retrieved in the future for various purposes such as auditing or billing. In this case, a data access request is received by the data access interface 365 and forwarded to the information access controller 370. Via the connection pooling mechanism 375, the information access controller 370 can control to retrieve the requested information from the database system 380 and return the retrieved data to the application that made the request. Similarly, a piece of stored information may be modified through the same functional blocks as described herein.

Figure 6:
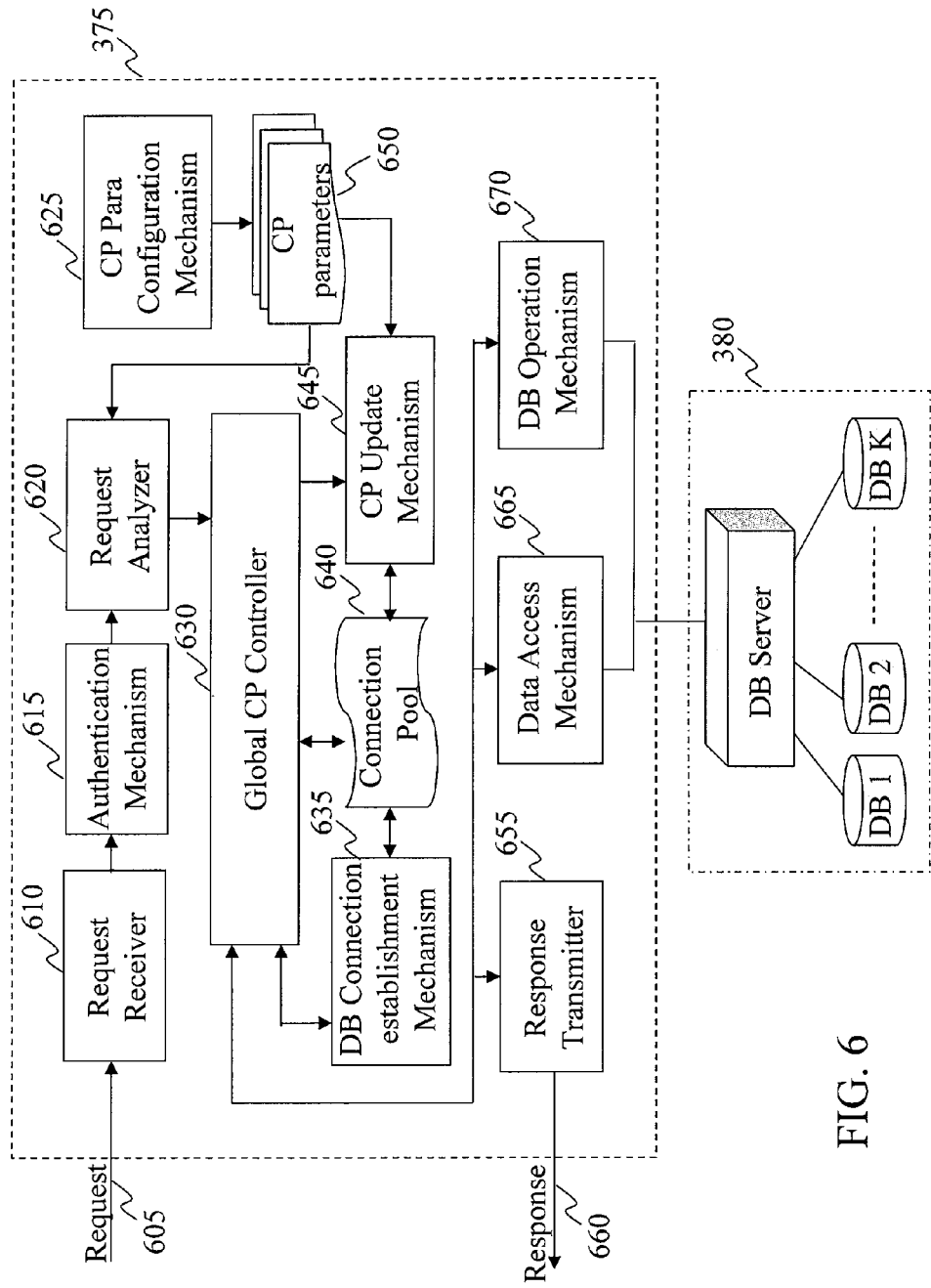
FIG. 6 depicts a system diagram of an exemplary connection pooling mechanism, according to an embodiment of the present teaching.

FIG. 6 depicts an exemplary system diagram of the connection pooling mechanism 375, according to an embodiment of the present teaching. The connection pooling mechanism 375 comprises a request receiver 610, a request analyzer 620, a global connection pooling controller 630, a connection pool 640, a connection pool update mechanism 645, a database connection establishment mechanism 635, a data access mechanism 665, a database operation mechanism 670, and a response transmitter 655. Processing flows among those system components for different tasks are discussed with reference to FIGS. 7 and 8.

Figures 7, 8:
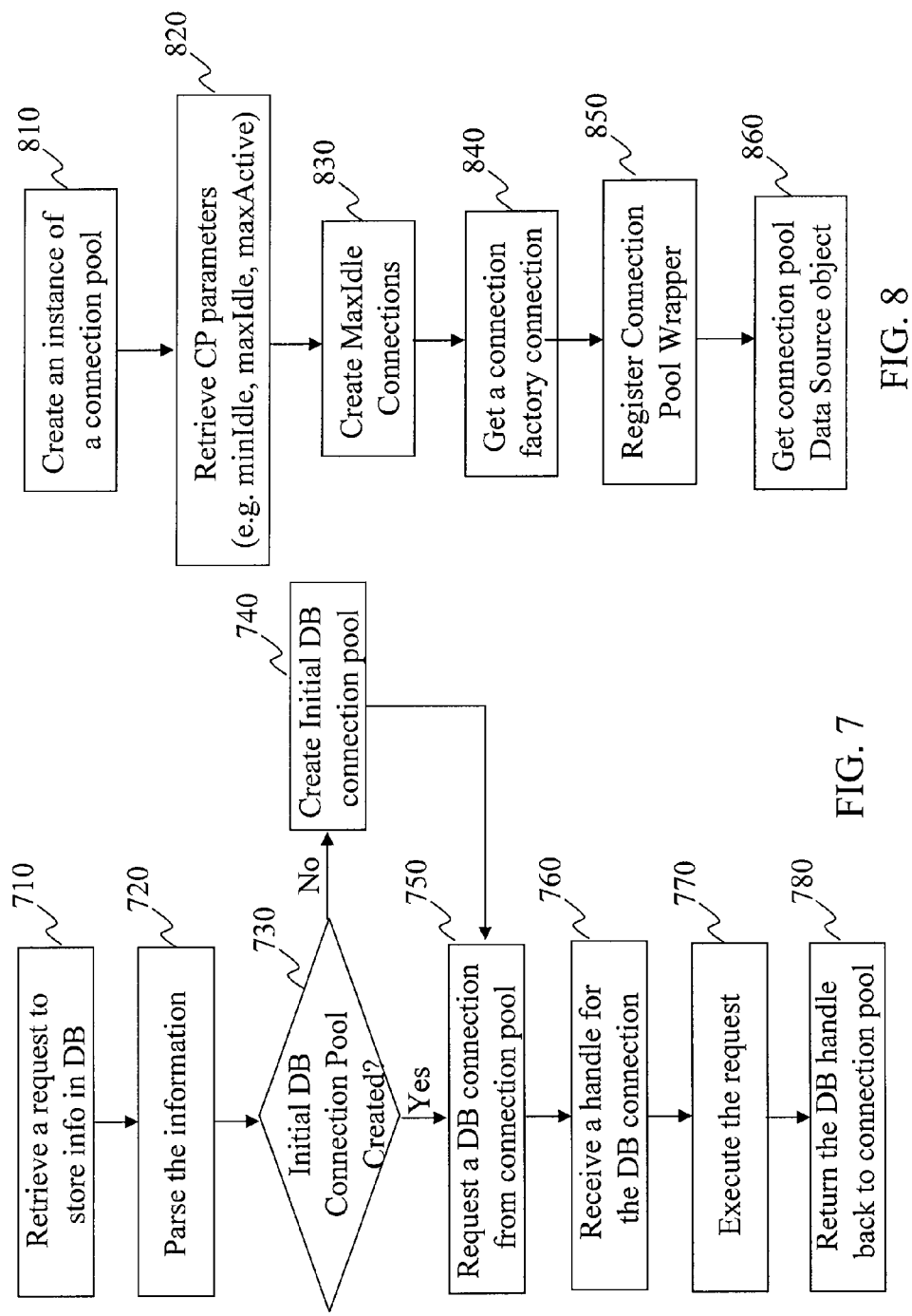
FIG. 7 is a flowchart of an exemplary process in which a database access request is handled via a connection pooling mechanism, according to an embodiment of the present teaching.
FIG. 8 is a flowchart of an exemplary process in which a connection pooling mechanism initializes a connection pool, according to an embodiment of the present teaching.

FIG. 7 is a flowchart of an exemplary process in which a database access request is handled via connection pooling, according to an embodiment of the present teaching. A request to access the database system 380 is first received, at 710, by the request receiver 610, and analyzed or parsed, at 720, by the request analyzer 620. To access the database, it is determined, at 730 by the global connection pooling controller 630, whether the database connection pool has been created. If no connection pool has been created, the global connection pooling controller 630 invokes the connection pool update mechanism 645 to create, at 740, an initial database connection pool 640.

When a connection pool exists (just created at 740 or created before current request, the global database connection controller 630 invokes the database connection establishment mechanism 635, at 750, to obtain a database connection for each received database access request. The database connection establishment mechanism 635 then requests a database connection handle from the connection pool 640. Upon receiving, at 760, the requested database connection handle, the database connection establishment mechanism 635 returns the handle to the global connection pooling controller 630. Depending on the nature of the data access request received, the global connection pooling mechanism 630 invokes the data access mechanism 665, with the database connection handle, to perform the requested data access at 770. If the access for a read operation, information read from the database is returned to the global connection pooling mechanism 630 and subsequently forwarded to the response transmitter 655 so that the data accessed can be returned to the requesting component (e.g., the information access controller 370 in FIG. 3). Once the database access is made, the global connection pooling controller 630 returns the database connection handle, at 780, back to the connection pool 640.

FIG. 8 is a flowchart of an exemplary process in which the connection pool update mechanism 645 creates an initial connection pool 640, according to an embodiment of the present teaching. In this exemplary embodiment, the connection pool is implemented based on an object oriented approach. An instance of a connection pool object is first created at 810. To implement details in the connection pool, various connection pooling parameters are retrieved at 820. Examples of such parameters may include, e.g., MinIdle for a minimum number of idle connections, MaxIdle for a maximum number of idle connections, or MaxActive for a maximum number of active connections opened. The initial connection pool is created based on such connection pooling parameters.

Such parameters may be determined independent of application threads so that even when there is no thread running, there are a minimum number of idle connections open so that whenever there is a request, the connection to the database can be readily made accessible without having to re-open the database connection which is expensive and slow. In addition, since all application threads share the database connections and whenever a connection is used, it is returned back to the connection pool so that other applications or threads can effectively utilize the same connection to access the database. This makes the connection pooling mechanism described herein cost effective so that the ESB provider is able to offer efficient data access services.

After the minimum number of connections are open in the connection pool 640, the global connection pool controller 630 receives, at 840, a connection factory connection, registers, at 850, a connection pool wrapper, and instantiates, at 860, a connection pool data source object in the context of the object oriented implementation. It is understood that what is disclosed herein is merely an example of implementation rather than limitation. Any other means to implement the connection pooling and the functionalities described herein does not deviate from the spirit of and therefore falls within the scope of the present teaching.

Figure 9:
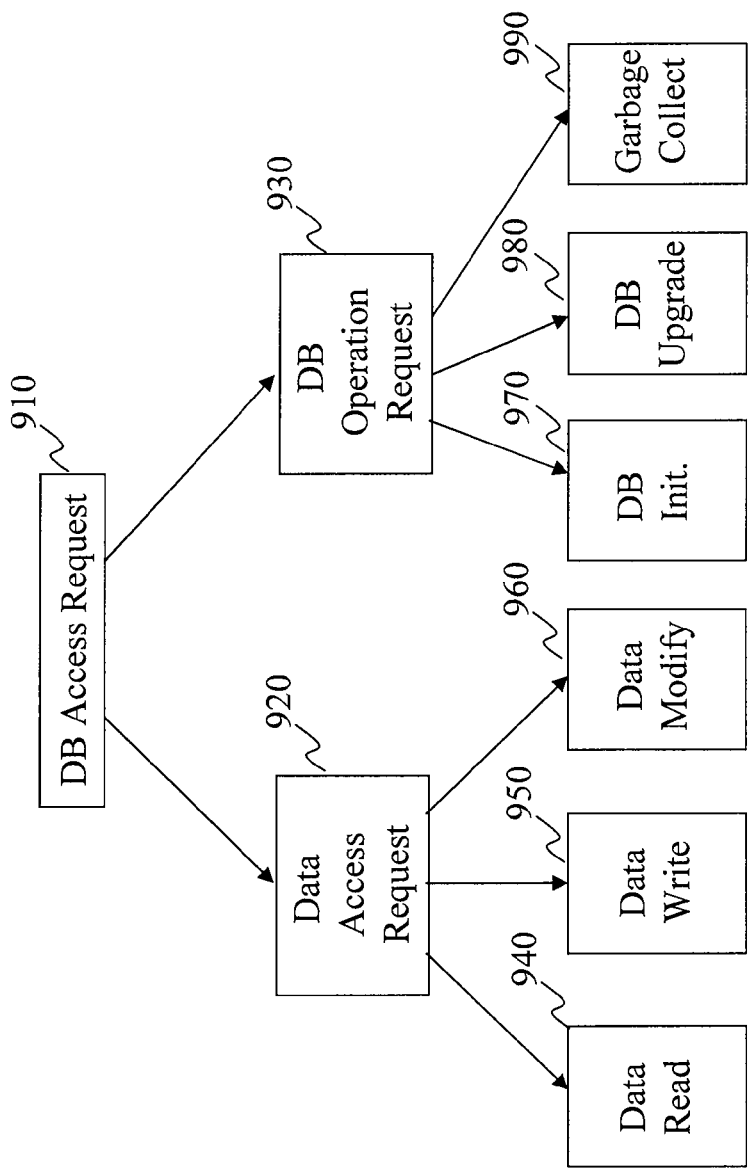
FIG. 9 illustrates exemplary types of database accesses.

Via the connection pooling mechanism 375, different types of database access can be achieved via connection pooling. FIG. 9 illustrates exemplary types of database accesses. A database access request 910 may be a data access request 920 or a database operational request 930. A data access request can be a data read operation 940, a data write operation 950, or data modification operation 960. A database operation may refer to an operation to be performed on the database itself without regard to the data stored therein. It may be considered as database maintenance related operations. Examples of a database operation may include database initialization operation 970, database upgrade operation 980, or garbage collection operation 990 when the memory space of the database system 380 becomes, e.g., too fragmented.

The exemplary system diagram for the connection pooling mechanism 375, as illustrated in FIG. 6, also includes some optional components such as an authentication mechanism 615, a connection pooling parameter configuration mechanism 625, and a set of connection pooling parameters 650 generated by the connection pooling parameter configuration mechanism 625. In some situations, a request to access a database may need to be authenticated before the request is being processed. In this case, the authentication mechanism 615 may authenticate the request first and then forward the authenticated request to the request analyzer 620 to further parsing analysis.

In addition, the connection pool 640 may be created or updated based on configuration parameters that can be dynamically changed. For example, the initial connection pool may be created with an initial minimum number of idle connections. This initial number of connections may be increased over time when the traffic increases. Such increase may be limited by an upper bound limit of a maximum number of connections in the connection pool. Such an upper bound limit may also be dynamically updated based on the traffic needs.

To dynamically update the connection pooling parameters, a system operator (not shown) may interface with the connection pooling parameter configuration mechanism 625 to configure or re-configure the parameters to be used to create or update the connection pool 640. The configured or re-configured parameters may be saved as the connection pooling parameters 650, which can be retrieved by the connection pooling update mechanism 645 to create or dynamically maintain the connection pool 640. In some embodiments, whenever there is a change in the saved connection pooling parameters, the connection pooling parameter configuration mechanism 625 may automatically trigger the connection pooling update mechanism 650 to retrieve the new parameters in order to properly maintain the connection pool 640.

In some embodiments, the connection pooling parameters may also be automatically updated based on, e.g., the actual traffic situation, observed by, e.g., the connection pooling parameter configuration mechanism 625. For instance, if for a period of time, the traffic is such that often there is a demand for more than the supply of connections opened in the connection pool, then the upper bound limit (e.g., MaxActive) as to the maximum number of connections in the pool may be increased so that more connections can be opened in the connection pool to meet the demand. If it is observed that the traffic is low so that there are often more idle connections than active connections, the upper bound limit of the number of connections open in the connection pool may be reduced so that some of the connections may be closed.

In some embodiments, even though the total number of connections open in the connection pool may be flexible, a minimum number of idle connections open in the connection pool may be maintained. For example, a minimum of 5 connections may be the lower bound limit. That is, even if there is no traffic, there are 5 database connections open so that as soon as the traffic starts, they can be readily used. In this way, there is no start-up time to open database connections needed, which can be time consuming. In some embodiments, even this lower bound limit may be designed to be alterable under some conditions. A timeout measure may be put in place so that if after a period of time specified by the timeout condition, there is no traffic observed at all, the minimum number if idle connections may be reduced to save the maintenance cost. This may be useful when, e.g., the network connection is not available so that there is no reason to keep as many idle connections open.

In operation, the connection pool 640 may therefore be maintained in accordance with the dynamically updated parameters, determined based on, e.g., real-time traffic conditions. Since the connection pooling mechanism 375 operates independent of application thread groups, such real-time traffic conditions are estimated based on the overall traffic from all applications as well as their overall threads. In addition, due to a minimum number of idle connections remaining open in the connection pool, they can be used by any application and thread and the efficiency in database access is improved.

Figure 10:
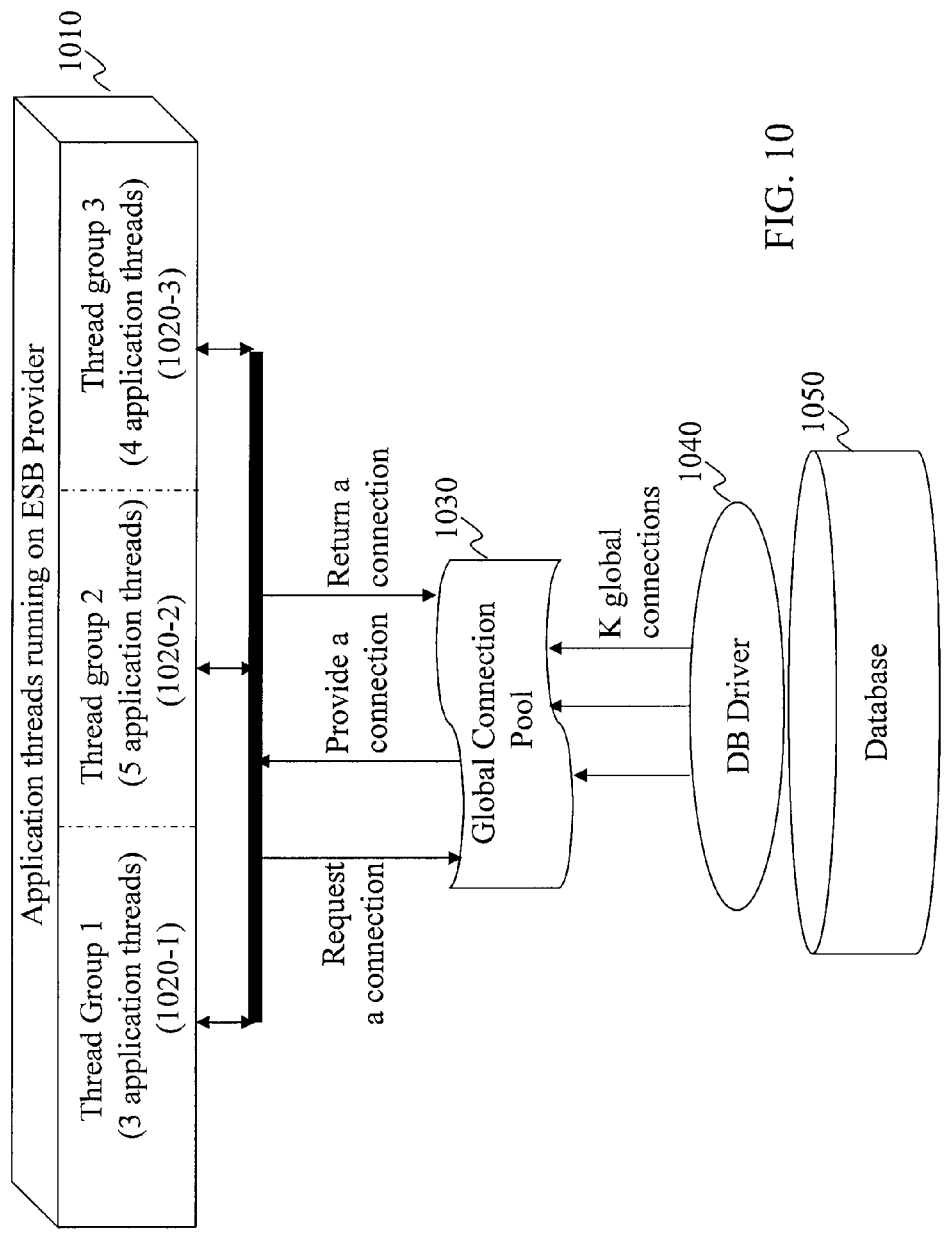
FIG. 10 depicts the mechanism in which a global connection pooling mechanism is used to improve the efficiency of database access, according to an embodiment of the present teaching.

FIG. 10 depicts how the global connection pooling mechanism 375, as discussed herein, is used to improve the efficiency of database access, according to an embodiment of the present teaching. In operation, at the application level 1010, there may be multiple thread groups running simultaneously, e.g., thread group 1 1020-1, thread group 2 1020-2, and thread group 3 1020-3. In each thread group, there can be multiple application threads, e.g., thread group 1 includes three application threads, thread group 2 includes 5 application threads, and thread group 3 includes 4 application threads. Each of the application threads in each thread group may make a request for a database connection to the global connection pool 1030 and receive a data connection handle from the global connection pool 1030.

The global connection pool 1030 resides within an ESB provider that interfaces the application layer 1010 with a database driver 1040 and a database 1050. The global connection pool 1030 has a number of database connections open so that whenever there is an application request to make a connection to the database 1050, a handle for an already open database connection is provided from the connection pool to the requesting application thread so that the time necessary to open a database connection is saved to make a database access. Once the requesting application thread completes the database access, the handle is returned back to the global connection pool 1030.

Figure 1A:
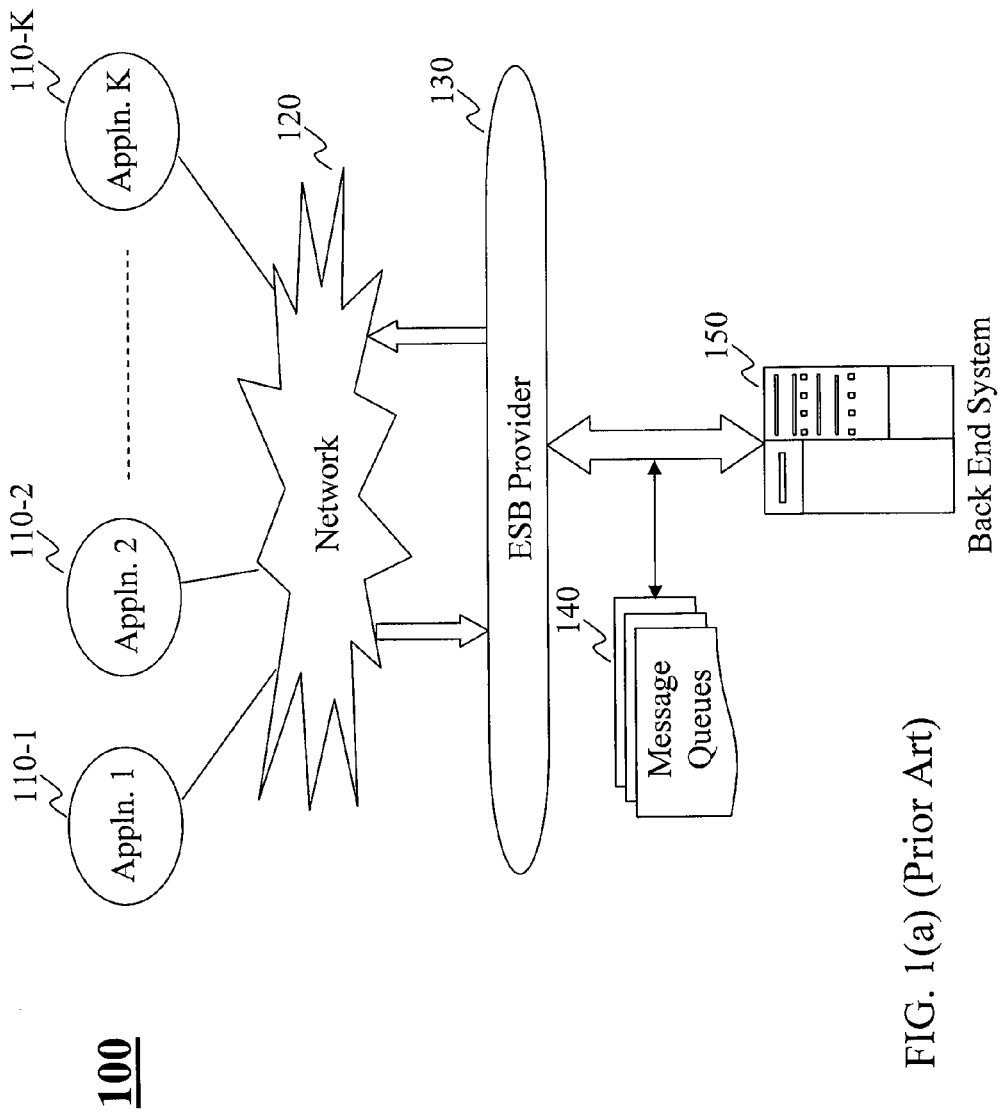
FIG. 1(a) (Prior Art) shows a conventional system configuration between front end applications and a back end system via an enterprise service bus (ESB) provider.
Figure 1B:
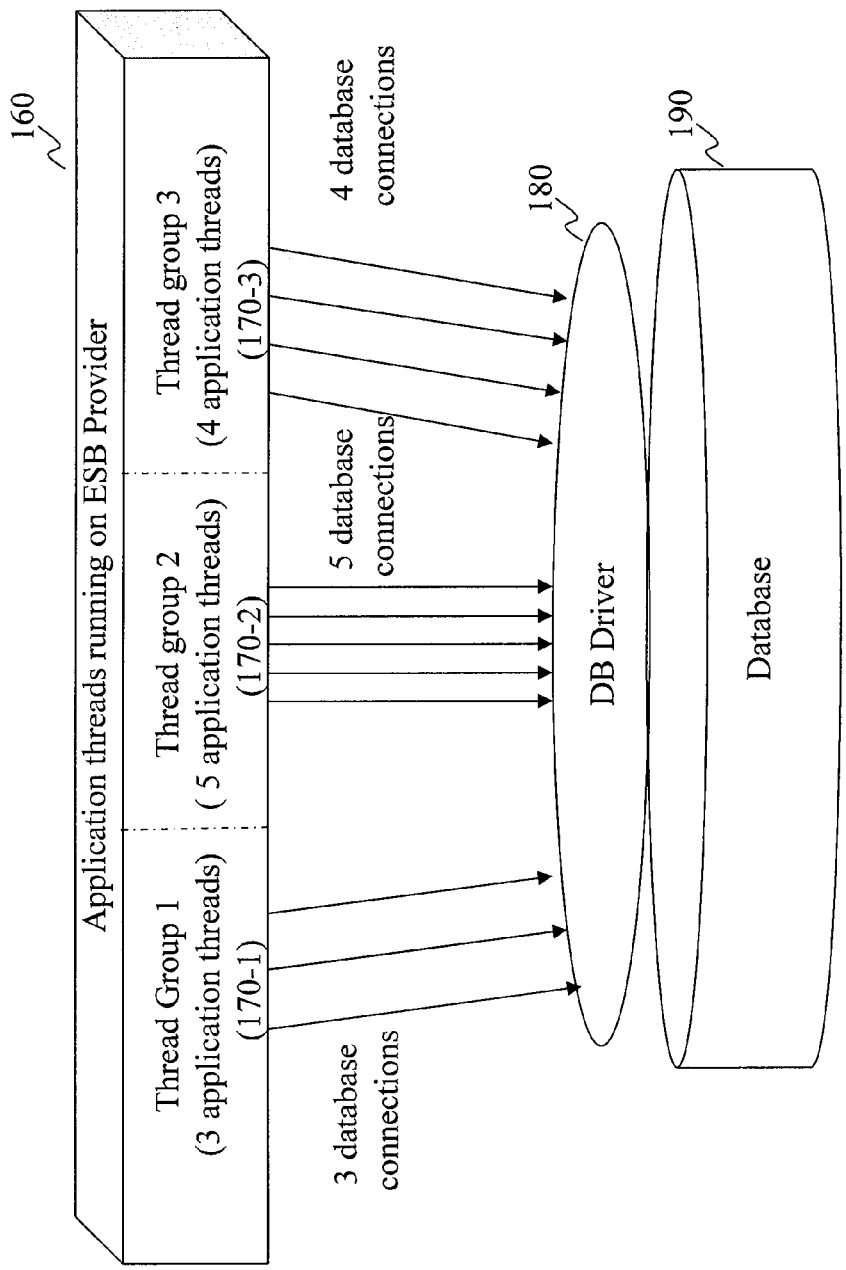
FIG. 1(b) (Prior Art) shows a conventional operational schematics in which each thread group determines individually a number of connections to a database during execution.

As seen in FIG. 1(b), with the conventional solution, when the total number of application threads running at the same time is 12 (3+5+4=12), there are a total of 12 database connections being opened in order to achieve connection pooling. This is due to the fact that the connection pooling in the conventional solution is based on thread level (rather than at a global level across individual threads and applications). With the connection pooling scheme described herein, the number of connections open to achieve connection pooling is determined independent of the actual number of threads and it is determined based on the actual traffic conditions. In FIG. 10, the total number of connections open in the connection pool 1030 is K, which is usually much smaller than the number of application threads (12). For instance, K can be a number as small as 3. In this manner, the connection pooling scheme described herein is more cost effective without sacrificing a fast turnaround access time for accessing databases in middleware. In addition, with the solutions described herein, the improved connection pooling mechanism requires minimum changes to the existing middleware architecture with yet improved performance.

Computer hardware platforms may be used as the hardware platform(s) for one or more of the network elements (e.g., request receiver 310, request processor 325, response transformer 355, or connection pooling mechanism 375) of the ESB Provider 210. A network or host computer platform may typically be used to implement a server. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment.

The hardware elements, operating systems and programming languages of such computers are conventional in nature, and it is presumed that those skilled in the art are adequately familiar therewith. Of course, the server functions may be implemented in a distributed fashion on a number of similar platforms, to distribute the processing load. Hence, aspects of the methods of receiving service requests through a common communication port in a server or network device from a variety of client applications, as outlined above, may be embodied in programming. Program aspects of the technology may be thought of as "products" or "articles of manufacture" typically in the form of executable code and/or associated data that is carried on or embodied in a type of machine readable medium. "Storage" type media include any or all of the memory of the computers, processors or the like, or associated modules thereof, such as various semiconductor memories, tape drives, disk drives and the like, which may provide storage at any time for the software programming.

All or portions of the software may at times be communicated through the Internet or various other telecommunication networks. Such communications, for example, may enable loading of the software from one computer or processor into another, for example, from a management server or host computer of the network operator or carrier into the platform of the ESB Provider 210 or other device implementing ESB or similar functionality. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the data aggregator, the customer communication system, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the ESB Provider 210 implementation described above is embodied in a hardware device, it can also be implemented as a software only solution—e.g., requiring installation on an existing server within FIG. 3.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method, comprising:
    receiving a request from an application at a first request receiver, wherein the requesting application is one of a plurality of applications accessing a system;
    processing the request received at the first request receiver by a request processor;
    transforming the request, as processed by the request processor, from a front end format supported by the requesting application into a back end format supported by the back end mechanism by a request transformer;
    forwarding, by a transceiver, the transformed request to a back end mechanism;
    receiving, by the transceiver, a response to the transformed request from the back end mechanism;
    obtaining information from the response via processing by a response processor;
    transforming, by a response transformer, the response, as processed by the response processor, from the back end format supported by the back end mechanism into the front end format supported by the requesting application of the plurality of applications accessing the system;
    transmitting, by a first response transmitter, the transformed response to the requesting application of the plurality of applications accessing the system;
    maintaining, by a connection pool mechanism, a single global pool of database connections with at least a minimum non-zero number of idle connections open, where the minimum non-zero number of idle connections is determined based on the overall traffic from all applications of the plurality of applications and independent of one or more threads of the application, and where each database connection in the single global pool of database connections is available for any use by all applications of the plurality of applications accessing the system;
    storing the obtained information in a database via a first database connection allocated from the pool of a plurality of database connections created to facilitate access to the database; and
    returning the first database connection to the single global pool of database connections for reuse.

2. The method of claim 1, wherein:
    the transformed request is forwarded to the back end mechanism via a message queue,
    the response is placed in the message queue by the back end mechanism as a response to the transformed request, and
    the information stored in the database relates to a transaction performed with respect to the transformed request.

3. The method of claim 1, wherein the pool of database connections is dynamically maintained based on observed traffic needs in accordance with a plurality of criteria.

4. The method of claim 3, wherein the plurality of criteria includes:
    a minimum number of idle connections;
    a maximum number of idle connections;
    a maximum number of active connections; and
    an idle connection timeout parameter.

5. The method of claim 1, wherein the step of storing the information comprises:
    receiving a request by an information controller to store the information from the response;
    obtaining the first database connection from the pool of database connections;
    executing the request to store the information from the response based on the first database connection; and
    returning the first database connection to the pool of database connections.

6. The method of claim 5, wherein the step of obtaining the first database connection comprises:
    determining, whether the pool of database connections has been created;
    if the pool has not been created, retrieving a plurality of connection pooling parameters and creating an instance of the pool of database connections with a minimum number of database connections based on the connection pooling parameters; and
    allocating one of the plurality of database connections as the first database connection for executing the request to store the information.

7. The method of claim 1, further comprising:
    receiving an information retrieval request requesting to access information stored in the database;
    allocating a second database connection from the pool of database connections;
    retrieving information from the database based on the second database connection; and
    returning the second database connection to the pool of database connections.

8. The method of claim 1, further comprising:
    maintaining a single global pool of database connections with at least a minimum non-zero number of idle database connections open, where determining the minimum non-zero number of idle database connections based on the overall traffic from all applications of the plurality of applications and independent of one or more application threads that are in communication with a middleware, and where each database connection in the single global pool of database connections is available for any use by all applications of a plurality of applications accessing the system;
    receiving a request from another application for accessing data stored in a middleware database, wherein the requesting another application is one of a plurality of applications accessing the system;
    obtaining a database connection from the single global pool of database connections;
    executing the request to access data stored in the database via the database connection; and
    returning the database connection to the single global pool of database connections for reuse.

9. A system, comprising:
    a first request receiver configured for receiving a request from an application, wherein the requesting application is one of a plurality of applications accessing a system;
    a request processor configured to process the request received at the first request receiver;
    a request transformer configured to transform the request, as processed by the request processor, from a front end format supported by the requesting application into a back end format supported by the back end mechanism;
    a transceiver configured for forwarding the transformed request to a back end mechanism and for receiving a response to the transformed request from the back end mechanism;

a response processor configured for processing the received response to obtain information from the response;

a response transformer configured to transform the response, as processed by the response processor, from the back end format supported by the back end mechanism into the front end format supported by the requesting application of the plurality of applications accessing the system;

a first response transmitter to transmit the transformed response to the requesting application of the plurality of applications accessing the system; and a connection pooling mechanism configured for maintaining a single global pool of database connections with at least a minimum non-zero number of idle connections open, where the minimum non-zero number of idle connections is determined based on the overall traffic from all applications of the plurality of applications and independent of one or more application threads, and for storing the information in a database via a database connection allocated from the pool of a plurality of database connections created to facilitate access to the database, where each database connection in the pool of the plurality of database connections is available for any use by all applications of the plurality of applications accessing the system.

10. The system of claim 9, wherein the information stored in the database relates to a transaction performed with respect to the request.

11. The system of claim 9, wherein the pool of database connections is dynamically maintained based on observed traffic needs in accordance with a plurality of criteria, the plurality of criteria including:
   a minimum number of idle connections;
   a maximum number of idle connections;
   a maximum number of active connections; and
   an idle connection timeout parameter.

12. The system of claim 9, wherein the connection pooling mechanism comprises:
   a second request receiver configured for receiving a request to access the database;
   a connection pool configured for hosting the plurality of database connections that can be used to access the database;
   an update mechanism configured for initializing and updating the connection pool in accordance with a plurality of connection pooling parameters;
   a connection pooling operator configured for executing the request to access the database based on the database connection and returning the database connection to the connection pool after the execution; and
   a response transmitter configured for transmitting a response to the request based on a status of database access performed based on the request.

13. The system of claim 12, wherein the connection pooling operator further comprises:
   a database connection establishment mechanism configured for obtaining a database connection from the pool of database connections; and
   a data access mechanism configured for interfacing with the database for data access using the database connection.

14. An article of manufacture, comprising:
   a machine readable storage medium having information stored thereon, the information, when read by the machine, causing the machine to perform the following for an enterprise service bus provider:
   receiving a request from an application at a first request receiver, wherein the requesting application is one of a plurality of applications accessing a system;
   processing the request received at the first request receiver by a request processor;
   transforming the request, as processed by the request processor, from a front end format supported by the requesting application into a back end format supported by the back end mechanism by a request transformer;
   forwarding, by a transceiver, the transformed request to a back end mechanism;
   receiving, by the transceiver, a response to the transformed request from the back end mechanism;
   obtaining information from the response via processing by a response processor;
   transforming, by a response transformer, the response, as processed by the response processor, from the back end format supported by the back end mechanism into the front end format supported by the requesting application of the plurality of applications accessing the system;
   transmitting, by a first response transmitter, the transformed response to the requesting application of the plurality of applications accessing the system;
   maintaining, by a connection pool mechanism, a single global pool of database connections with at least a minimum non-zero number of idle database connections open, where the minimum non-zero number of idle database connections is determined based on the overall traffic from all a applications of the plurality of applications and independent of one or more threads of the application, and where each database connection in the single global pool of database connections is available for any use by all different threads of the application or other applications of the plurality of applications accessing the system; and
   storing the obtained information in a database via a first database connection allocated from the pool of database connections created to facilitate access to the database; and returning the first database connection to the single global pool of database connections.

15. The article of manufacture of claim 14, wherein:
   the transformed request is forwarded to the back end mechanism via a message queue,
   the response is placed in the message queue by the back end mechanism as a response to the transformed request, and
   the information stored in the database relates to a transaction performed with respect to the transformed request.

16. The article of manufacture of claim 14, wherein the pool of database connections is dynamically maintained based on observed traffic needs in accordance with a plurality of criteria.

17. The article of manufacture of claim 16, wherein the plurality of criteria includes:
   a minimum number of idle connections;
   a maximum number of idle connections;
   a maximum number of active connections; and
   an idle connection timeout parameter.

18. The article of manufacture of claim 14, wherein the step of storing the information comprises:
   receiving a request by an information controller to store the information obtained from the response;
   obtaining the first database connection from the pool of database connections;
   executing the request to store the information obtained from the response based on the first database connection; and returning the first database connection to the pool of database connections.

19. The article of manufacture of claim 18, wherein the step of obtaining the first database connection comprises:
   determining, whether the pool of database connections has been created;
   if the pool has not been created, retrieving a plurality of connection pooling parameters and creating an instance of the pool of database connections with a minimum number of database connections based on the connection pooling parameters; and
   allocating one of the plurality of database connections as the first database connection for executing the request to store the information obtained from the response.

20. The article of manufacture of claim 14, further comprising:
   receiving an information retrieval request requesting to access information stored in the database;
   allocating a second database connection allocated from the pool of database connections;
   retrieving information from the database based on the second database connection; and
   returning the second database connection to the pool of database connections.

21. The article of manufacture of claim 14, further comprising:
   maintaining a single global pool of database connections with at least a minimum non-zero number of idle database connections open, where determining the minimum non-zero number of idle connections based on the overall traffic from all applications of the plurality of applications and independent of one or more application threads, and where each database connection in the single global pool of database connections is available for any use by all different threads of the application or other applications of a plurality of applications accessing the system;
   receiving a request from another application for accessing data stored in a database, wherein the requesting another application is one of a plurality of applications accessing the system;
   obtaining a database connection from the single global pool of data connections;
   executing the request to access data stored in the database via the database connection; and
   returning the database connection to the pool of database connections for reuse.

22. The article of manufacture of claim 21, wherein the data access includes at least one of data read, data write, and data modification.

23. The system of claim 9, wherein the connection pooling mechanism further comprises:
   an authentication mechanism configured to authenticate the received request before the request is processed by the request processor; and
   a request analyzer configured to perform parsing analysis of the authenticated request.

24. The method of claim 1, wherein maintaining a single global pool of database connections with at least a minimum non-zero number of idle connections open, comprises:
   setting a timer for a period of time specified by a timeout condition;
   observing traffic conditions for the period of time; and
   in response to an observation of no traffic, reducing the minimum number of non-zero idle connections.

25. The method of claim 8, wherein maintaining a single global pool of database connections with at least a minimum non-zero number of idle connections open, further comprises:
   setting a timer for a period of time specified by a timeout condition;
   observing traffic conditions for the period of time; and
   in response to an observation of no traffic, reducing the minimum number of non-zero idle connections.

26. The system of claim 9, wherein the connection pooling mechanism is further configured, when maintaining a single global pool of database connections with at least a minimum non-zero number of idle connections open, to:
   set a timer for a period of time specified by a timeout condition;
   observe traffic conditions for the period of time; and
   in response to an observation of no traffic, reduce the minimum number of non-zero idle connections.

27. The method of claim 1, wherein maintaining a single global pool of database connections with at least a minimum non-zero number of idle connections open, comprises:
   in response to a saved change of new connection pooling parameters, retrieving the saved new connection pooling parameters; and
   dynamically maintaining the single global pool of database connections according to the retrieved saved new connection pooling parameters.

28. The method of claim 8, wherein maintaining a single global pool of database connections with at least a minimum non-zero number of idle connections open, further comprises:
   in response to a saved change of new connection pooling parameters, retrieving the saved new connection pooling parameters; and
   dynamically maintaining the single global pool of database connections according to the retrieved saved new connection pooling parameters.

29. The system of claim 9, wherein the connection pooling mechanism is further configured, when maintaining a single global pool of database connections with at least a minimum non-zero number of idle connections open, to:
   in response to a saved change of new connection pooling parameters, retrieve the saved new connection pooling parameters; and
   dynamically maintain the single global pool of database connections according to the retrieved saved new connection pooling parameters.

30. The method of claim 1, wherein maintaining a single global pool of database connections with at least a minimum non-zero number of idle connections open, comprises:
   in response to a demand for more than a current supply of connection open in the connection pool, increasing the maximum number of active connections to the maximum number of connections in the single global pool to meet the demand, wherein the demand is determined based on traffic conditions observed for a period of time; and
   after a subsequent period of time and in response to a decrease in demand for the maximum number of active connections, reducing the number of open connections in the single global connection pool.

31. The method of claim 8, wherein maintaining a single global pool of database connections with at least a minimum non-zero number of idle connections open, further comprises:
   in response to a demand for more than a current supply of connection open in the connection pool, increasing the maximum number of active connections to the maximum number of connections in the single global pool to meet the demand, wherein the demand is determined based on traffic conditions observed for a period of time; and after a subsequent period of time and in response to a decrease in demand for the maximum number of active connections, reducing the number of open connections in the single global connection pool.

32. The system of claim 9, wherein the connection pooling mechanism is further configured, when maintaining a single global pool of database connections with at least a minimum non-zero number of idle connections open, to:

in response to a demand for more than a current supply of connection open in the connection pool, increase the maximum number of active connections to the maximum number of connections in the single global pool to meet the demand, wherein the demand is determined based on traffic conditions observed for a period of time; and after a subsequent period of time and in response to a decrease in demand for the maximum number of active connections, reduce the number of open connections in the single global connection pool.

* * * * *